No. 770,867. Patented September 27, 1904.

UNITED STATES PATENT OFFICE.

HARRY NORTHWOOD, OF WHEELING, WEST VIRGINIA.

PROCESS OF DECORATING GLASSWARE WITH LIQUID GOLD.

SPECIFICATION forming part of Letters Patent No. 770,867, dated September 27, 1904.

Application filed May 12, 1904. Serial No. 207,688. (No specimens.)

*To all whom it may concern:*

Be it known that I, HARRY NORTHWOOD, a citizen of the United States of America, and a resident of Wheeling, county of Ohio, and State of West Virginia, have invented a certain new and useful Process of Decorating Glassware with Liquid Gold, of which the following is a specification.

My invention relates to the process of decorating glassware with liquid gold, and more particularly to a new and useful process for treating glassware preparatory to applying liquid gold or other decorations thereto; and it has for its object to provide a process for preparing glassware for the application of gold decorations.

It further has for its object to cheapen the process of gold-decorating and to render the same more expeditious, to render the gold brighter in appearance when applied, and to cause it to more tenaciously adhere to the ware.

As is well known, gold has not an affinity for glass, hence will not adhere thereto if directly applied. An intermediate coating must therefore be applied to the ware before applying the gold decorations, such coating being of a character which will serve as a mounting for the gold. The method hitherto employed to prepare glassware for the application of liquid gold, which is gold reduced to a liquid form of about the consistency of paint, has been to paint the surface of the ware wherever it was desired to have the gold adhere with a preparation or paste consisting of sulfate of copper or other metallic salts or crystals dissolved in water and mixed with yellow ocher as a medium. The ware was then submitted to sufficient heat in a muffle, kiln, or leer to cause said paste to act upon the ware where applied, and thus form the desired coating. The ware was then washed and dried, after which the gold was applied and the ware fired in the ordinary manner.

By my invention a process is provided whereby the work is cheapened and facilitated and whereby better results are accomplished or attained than can possibly be by the old method—that which has just been described.

My said process consists first in applying to the heated ware immediately or shortly after it is made or finished a powder made from raw or burnt sulfate of copper, sulfate of iron, or other metallic salts, but preferably burned. The ware is then submitted in the ordinary manner to the heat of the annealing ovens or leers, after which it is preferably rinsed and dried, when it is ready for the application of the gold decorations in the ordinary manner. The salts are burned until they crumble into a powder suitable for dusting over the surface of the ware, or the raw salts may be powdered in any suitable manner. When it is desired to produce a weaker powder than is secured from the raw or burnt salts, said salts are diluted with water and a quantity of sand dropped therein. This becomes what may be termed a "saturated" solution of sand and salts, which is then dried to form the powder. In practice I dissolve in a quantity of water as much of the metallic salts as the water will take up in two days' time, then remove the undissolved salts and add to the water as much sand as will absorb the water, after which the sand is dried, as above mentioned. The dusting of the surface of the glassware with the powder while said ware is yet in a heated state and subsequently annealing the ware with the powder thereon produces much the same result as that obtained by painting said ware when cold with the metallic salts and ocher paste.

Since, as is well known, copper has an affinity for glass, when the metallic powder and glass are submitted to the intense heat of the annealing-oven the copper in the powder penetrates the pores of the glass, staining said glass very slightly and forming a thin metallic deposit upon the surface of the ware. As is also well known, gold has an affinity for and can be worked with copper. Hence said metallic coating furnishes a most suitable mounting for the gold. The intermediate deposit or coating thus formed by my process possesses, however, marked advantages over that of the old process, since the gold adheres thereto much more tenaciously and presents a much brighter appearance. It further has the advantage of cheapening the process of decorating, and consequently the cost of production, since it does away entirely with the painting of the ware with the paste, the preparatory firing of the ware, the washing of the ware to get rid of the paste, &c. Moreover, the finished ware is produced in a much shorter length of time than could possibly be done by the process hitherto employed.

A liquid consisting of metallic salts diluted with water may be used instead of the powder, and the results attained will be much the same. However, for obvious reasons the powder is preferred.

Having thus described my invention, what I claim as new, and desire to secure by Letters Patent, is—

1. A gold-decorating process for glassware consisting in submitting the surface of the ware while in a heated state to an application of a powder formed from metallic salts, annealing the ware, rinsing it, drying it, and applying liquid gold in the ordinary manner.

2. The process of decorating glassware with liquid gold, consisting in submitting the surface of the ware, at the time it is made and while in a heated state, to the application of a powder, annealing the ware with the powder thereon, cooling the ware, rinsing off the excess powder, drying the ware, and applying liquid gold in the ordinary manner.

3. The process of decorating glassware with liquid gold, consisting in submitting the surface of the ware, at the time it is made and while in a heated state, to an application of a powder made by burning suitable metallic salts, annealing the ware with the powder thereon, cooling the ware, rinsing off the excess powder, drying the ware, and applying liquid gold in the ordinary manner.

4. The process of decorating glassware with liquid gold, consisting in dusting the ware, at the time it is made and while in a heated state, with a powder which will form a coating for which gold has an affinity, annealing such powdered ware, cooling the same, rinsing off the surplus powder, drying the ware, and then applying the liquid gold in the ordinary manner.

5. The process of decorating glassware with liquid gold, consisting in dusting the ware, at the time it is made and while in a heated state, with a powder made by burning metallic salts which will form a coating for which gold has an affinity, annealing said ware, and applying liquid gold over the resultant coating.

6. The process of decorating glassware with liquid gold, consisting in dusting the ware, at the time it is made and while in a heated state, with a powder made from sulfate of copper, annealing said ware with the powder thereon, cooling the same, and then applying liquid gold in the ordinary manner over the resultant coating.

7. The process of decorating glassware with liquid gold, consisting in dusting the ware, at the time it is made and while in a heated state, with a powder made by burning metallic salts until they crumble, annealing said ware, cooling the same, rinsing off the surplus coating, drying the ware, and then applying liquid gold in the ordinary manner.

8. The process of decorating glassware with liquid gold, consisting in dusting the surface of the ware, at the time it is made and while in a heated state, with a powder made from sulfate of copper, annealing said ware, cooling the same, rinsing, drying, and then applying liquid gold over the resultant coating in the ordinary manner.

9. The process of decorating glassware with liquid gold, consisting in dusting the surface of the ware, when in a heated state, with a powder made from metallic salts, annealing the ware, cooling, rinsing, drying, and then applying liquid gold in the ordinary manner.

10. The process of decorating glassware with liquid gold, consisting in applying to the ware, while in a heated state, a coating of a powder which will form thereon a coating having an affinity for gold, annealing the ware, and applying liquid gold in the ordinary manner.

11. The process of decorating glassware with liquid gold, consisting in powdering the ware, while in a heated state, with a dried saturated solution of sand and metallic salts, annealing the ware so as to form a coating on the ware having an affinity for gold, rinsing off the excess powder, drying, and then applying liquid gold in the ordinary manner.

12. The process of decorating glassware with liquid gold, consisting in applying to the surface of the ware, while said ware is in a heated state, a powdered solution of sand and metallic salts adapted to form on the said surface of the ware an intermediate deposit for which gold has an affinity, annealing the ware, rinsing, drying, and then applying liquid gold in the ordinary manner.

Signed by me at Wheeling, West Virginia, this 9th day of March, 1903.

HARRY NORTHWOOD.

Witnesses:
H. E. DUNLAP,
CARL NORTHWOOD.